US010782665B2

(12) United States Patent
Stagg (10) Patent No.: US 10,782,665 B2
(45) Date of Patent: Sep. 22, 2020

(54) WIRELESS EMERGENCY STOP SYSTEMS, AND CORRESPONDING METHODS OF OPERATING A WIRELESS EMERGENCY STOP SYSTEM FOR A MACHINE SAFETY INTERFACE

(71) Applicant: Laird Technologies, Inc., Earth City, MO (US)

(72) Inventor: David Stagg, Flat Rock, NC (US)

(73) Assignee: Cattron North America, Inc., Warren, OH (US)

( * ) Notice: Subject to any disclaimer, the term of this patent is extended or adjusted under 35 U.S.C. 154(b) by 0 days.

(21) Appl. No.: 15/664,606

(22) Filed: Jul. 31, 2017

(65) Prior Publication Data

US 2019/0004489 A1    Jan. 3, 2019

Related U.S. Application Data (60) Provisional application No. 62/527,853, filed on Jun. 30, 2017.

(51) Int. Cl.
| | | |
|---|---|---|
| *G05B 19/048* | (2006.01) | |
| *G05B 9/02* | (2006.01) | |
| *G05B 19/042* | (2006.01) | |

(52) U.S. Cl.
CPC ............. *G05B 19/048* (2013.01); *G05B 9/02* (2013.01); *G05B 19/0425* (2013.01);
(Continued)

(58) Field of Classification Search
CPC ........ G05B 19/048; G05B 2219/24024; G05B 9/02; G05B 19/0428; B25J 9/1674
(Continued)

(56) References Cited

U.S. PATENT DOCUMENTS

| | | | |
|---|---|---|---|
| 6,285,860 B1 * | 9/2001 | Szarka | ...................... H04B 1/46 340/12.5 |
| 7,005,997 B1 * | 2/2006 | Wiewiura | ............... F16P 3/147 340/3.1 |

(Continued)

FOREIGN PATENT DOCUMENTS

| | | |
|---|---|---|
| CN | 202205338 U | 4/2012 |
| DE | 102012009896 A1 | 11/2013 |

(Continued)

OTHER PUBLICATIONS

Canadian office action for Canadian application No. 3004857 which claims priority to the instant application, dated Mar. 22, 2019, 6 pages.

(Continued)

*Primary Examiner* — Rocio Del Mar Perez-Velez
*Assistant Examiner* — Alicia M. Choi
(74) *Attorney, Agent, or Firm* — Harness, Dickey & Pierce, P.L.C.; Anthony G. Fussner (57) ABSTRACT

Exemplary embodiments are provided of wireless emergency stop systems. In an exemplary embodiment, a wireless emergency stop system includes a machine safety device wired to a machine stop circuit for stopping operation of a machine when the machine stop circuit is activated. The machine safety device includes a wireless communication interface. The system also includes multiple personal safety devices. Each personal safety device includes a wireless communication interface for wireless communication with the machine safety device, and an emergency stop switch. The emergency stop switch is configured to, when activated, transmit an emergency stop signal to the machine safety device to trigger an emergency stop of the machine. The machine safety device is configured to maintain wireless connections with more than one of the multiple personal (Continued)

safety devices at the same time. Example methods of operating a wireless emergency stop system are also disclosed.

22 Claims, 3 Drawing Sheets

(52) U.S. Cl.
CPC ............ *G05B 2219/15117* (2013.01); *G05B 2219/24003* (2013.01); *G05B 2219/24024* (2013.01)

(58) Field of Classification Search
USPC .......................................................... 700/79
See application file for complete search history.

(56) References Cited

U.S. PATENT DOCUMENTS

| | | | |
|---|---|---|---|
| 7,209,703 | B1 | 4/2007 | Yarkosky |
| 7,272,456 | B2 | 9/2007 | Farchmin et al. |
| 7,876,220 | B2 | 1/2011 | Aldridge |
| 8,005,572 | B2 | 8/2011 | Evans et al. |
| 8,125,313 | B2 * | 2/2012 | Griessnig ............ G05B 19/409 340/10.4 |
| 8,290,646 | B2 | 10/2012 | Ecton et al. |
| 8,334,622 | B2 | 12/2012 | Olsson et al. |
| 8,457,828 | B2 | 6/2013 | Self et al. |
| 2005/0023261 | A1 * | 2/2005 | Zheng ................. B23K 9/1274 219/130.5 |
| 2005/0218215 | A1 * | 10/2005 | Lauden .............. G07C 9/00087 235/380 |
| 2006/0097860 | A1 * | 5/2006 | Halfmann ................ G05B 9/02 340/459 |
| 2010/0127824 | A1 | 5/2010 | Moschl et al. |
| 2011/0160910 | A1 | 6/2011 | Preisinger et al. |
| 2014/0148940 | A1 | 5/2014 | Susnjara |
| 2014/0211358 | A1 * | 7/2014 | Dotson .................. H01H 3/022 361/115 |
| 2015/0032293 | A1 | 1/2015 | O'Neill et al. |
| 2015/0180527 | A1 * | 6/2015 | Fathollahi ............ H04B 1/3888 455/575.8 |
| 2015/0351260 | A1 | 12/2015 | Meftah et al. |
| 2016/0124428 | A1 * | 5/2016 | Nutaro ................. G05D 1/0011 701/2 |
| 2016/0379482 | A1 | 12/2016 | Saito et al. |
| 2017/0031339 | A1 | 2/2017 | Corbeil et al. |
| 2017/0075329 | A1 | 3/2017 | Whittaker |
| 2017/0329307 | A1 * | 11/2017 | Castillo-Effen ...... G05B 19/042 |
| 2018/0141751 | A1 * | 5/2018 | Muranaka ................ B25J 13/06 |
| 2019/0187658 | A1 * | 6/2019 | Fischer .............. G05B 19/4184 |

FOREIGN PATENT DOCUMENTS

| | | |
|---|---|---|
| EP | 1327922 A1 | 7/2003 |
| EP | 1519272 B1 | 6/2010 |
| EP | 1935110 B1 | 12/2010 |
| EP | 2865935 A1 | 4/2015 |
| GB | 2198614 A | 6/1988 |
| JP | H09258801 A | 10/1997 |
| JP | 2016117104 A | 6/2016 |
| WO | WO-2016202666 A1 | 12/2016 |

OTHER PUBLICATIONS

European Search Report for European application No. 18172056 which claims priority to the same parent application as the instant application, dated Nov. 14, 2018, 9 pages.
European Office Action for EP18172056.6 which claims priority to the instant application; dated Jun. 4, 2020, 6 pages.
Canadian office action for Canadian application No. 3004857 which claims priority to the instant application, dated Mar. 2, 2020, 8 pages.

\* cited by examiner

WIRELESS EMERGENCY STOP SYSTEMS, AND CORRESPONDING METHODS OF OPERATING A WIRELESS EMERGENCY STOP SYSTEM FOR A MACHINE SAFETY INTERFACE

CROSS-REFERENCE TO RELATED APPLICATIONS

This application claims the benefit and priority of U.S. Provisional Application No. 62/527,853, filed on Jun. 30, 2017. The entire disclosure of the above application is incorporated herein by reference.

FIELD

The present disclosure generally relates to wireless emergency stop systems, and corresponding methods of operating a wireless emergency stop system for a machine safety interface.

BACKGROUND

This section provides background information related to the present disclosure which is not necessarily prior art.

Hardwired emergency stop stations are often used in connection for machine and equipment safety, to allow operators to safely bring a machine or process to a safe state. However, these hardwired stations can require time for an operator to move to the location of the hardwired stop switch in order to trigger the emergency stop process.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

The inventors herein have recognized that hardwired emergency stop stations are often used in connection for machine and equipment safety, to allow operators to safely bring a machine or process to a safe state. However, these hardwired stations can require time for an operator to move to the location of the hardwired stop switch in order to trigger the emergency stop process.

The inventors have also recognized that a wireless emergency stop switch can bring emergency stop capability directly to the user, and enable the user to instantly activate the emergency stop switch even when a hardwired station is out of reach or in a hazard zone.

Described herein are exemplary embodiments of wireless emergency stop systems including one or more personal safety devices (PSDs) each having an emergency stop (E-stop) switch. The systems also include one or more machine safety devices (MSDs) that are connected to (e.g., wired in, etc.) to a hardwired emergency stop circuit.

In some embodiments, multiple personal safety devices operate with a single machine safety device. In these cases, the personal safety devices follow a linking protocol with the machine safety device that allows the personal safety devices to de-link (e.g., when no longer being used, etc.) without shutting down the machine connected to the machine safety device.

As mentioned above, a machine safety device is hardwired into a machine stop circuit (e.g., a safety circuit capable of shutting down operation of the machine, etc.). The machine stop circuit includes a radio interface capable of wireless communication with multiple personal safety devices.

The machine safety device implements a high level of safety by maintaining its safety relay(s) closed (e.g., so that a connected machine is allowed to operate normally, etc.) when no personal safety devices are connected to the machine safety device and no internal faults of the machine safety device are detected. If one or more personal safety devices are connected (e.g., linked, etc.) with the machine safety device, the machine safety device will maintain its safety relays closed when wireless (e.g., radio frequency (RF), etc.) communication with all connected personal safety devices is good (e.g., has a sufficient threshold connection quality, etc.) and no connected personal safety devices have activated an emergency stop switch. In some cases, the machine safety device may only maintain its safety relays closed when the above conditions are true.

The machine safety device may open its safety relay(s) (e.g., to stop operation of the connected machine, etc.) when any of the following conditions occur: an internal fault of the machine safety device is detected, a connected personal safety device loses wireless communication with the machine safety device, a connected personal safety device activates its emergency stop switch, a fault of a connected personal safety device is detected, etc.

As mentioned above, each personal safety device follows a protocol for linking to and de-linking from the machine safety device without causing a stop of the machine connected to the machine safety device. This protocol may include one or more direct actions from the operator to link or de-link the personal safety device, which are distinctly different from a loss of wireless communication or activation of the emergency stop switch of the personal safety device.

Examples of wireless emergency stop systems, as described herein, can provide a simpler method for connecting multiple wireless emergency stop devices with a single machine safety device, increase efficiency and lower cost as compared to using multiple machine safety devices, etc.

Figure 1:
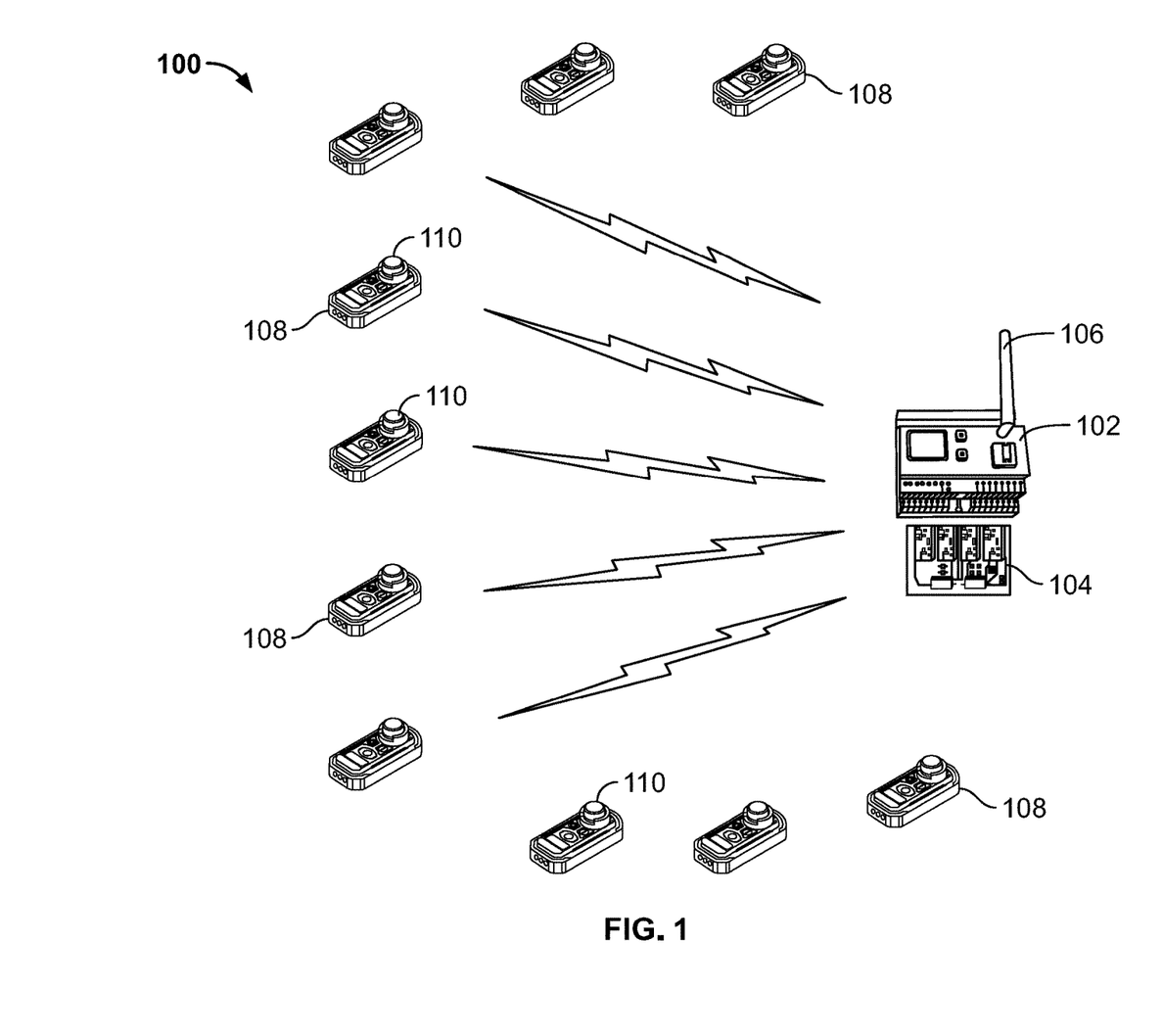
FIG. 1 illustrates a wireless emergency stop system according to one exemplary embodiment of the present disclosure.

FIG. 1 illustrates an exemplary embodiment of a wireless emergency stop system 100 having a machine safety device 102 (e.g., machine control unit (MCU)) and a machine stop circuit 104. The machine safety device 102 is wired to the machine stop circuit 104 for stopping operation of a machine (not shown) when the machine stop circuit 104 is activated.

The machine safety device 102 includes a wireless communication interface 106. For example, the wireless communication interface 106 of the machine safety device 102 may include any suitable antenna configured for wireless communication (e.g., radio frequency (RF) wireless communication, etc.).

The system 100 also includes multiple personal safety devices 108 (e.g., operator control units (OCUs), etc.). Each personal safety device 108 includes a wireless communication interface for wireless communication with the machine safety device 102 (e.g., via the wireless communication interface 106 of the machine safety device 102, etc.).

Each personal safety device 108 includes an emergency stop button 110. The emergency stop button 110 is configured to, when activated (e.g., by an operator carrying the personal safety device 108, etc.), transmit an emergency stop signal to the machine safety device 102 to trigger an emergency stop of the machine (e.g., via the machine stop circuit 104, etc.). Therefore, an operator carrying a personal safety device 108 may use the emergency stop button 110 to quickly trigger an emergency stop of a machine, without having to move to the location of the machine safety device 102. In some embodiments, activation of the emergency stop button 110 may trigger an emergency stop of the machine within less than about 500 milliseconds, etc.

The machine safety device 102 is configured to maintain wireless connection with more than one of the personal safety devices 108 at the same time. This provides multiple operators with the ability to trigger an emergency stop of a machine via their corresponding personal safety devices 108. For example, the machine safety device 102 may maintain wireless communication with three personal safety devices 108 simultaneously, with five personal safety devices 108 simultaneously, with ten personal safety devices 108 simultaneously, etc.

As explained further below, the machine safety device 102 includes several protocols for determining when to activate the machine stop circuit 104 to stop operation of the machine, and the each personal safety device 108 follows a linking and de-linking protocol to wirelessly connect to and disconnect from the machine safety device 102 without triggering an emergency stop. This allows multiple operators to connect a personal safety device 108 as desired (e.g., when working with the machine connected to the machine stop circuit 104, etc.), while also allowing the operators to disconnect the personal safety device 108 when they are finished working with machine, when the personal safety device 108 needs to charge, etc.

In some embodiments, the machine safety device 102 may include one or more safety relays. For example, the machine safety device 102 may include one or more safety relays for activation in response to an emergency stop button activation, and one or more safety relays for activation in response to a loss of wireless communication. Each of the one or more safety relays may be connected to the machine stop circuit 104. In some embodiments, the relays may include multiple switches (e.g., single contact switches, two-level enable switches, etc.). The relays may be redundant (e.g., redundant E-stop relays and communication loss relays, etc.). For example, two safety relays may be wired in series with an external hard-wired E-stop circuit that allows a machine to run.

The machine safety device 102 may open the relay(s) to stop operation of the machine when an emergency stop is triggered by one of the multiple personal safety devices 108. The machine safety device 102 may maintain the relay(s) in a closed state to allow operation of the machine while the emergency stop is not triggered.

The machine safety device 102 may use any suitable protocol(s) for determining when to allow normal operation of the machine (e.g., by leaving relay(s) of the machine safety device 102 in a closed state, etc.). For example, when no personal safety devices 108 are connected with (e.g., linked with, etc.) the machine safety device 102, the machine safety device may maintain normal operation when no internal fault of the machine safety device 102 is detected.

When one or more personal safety devices 108 are connected with the machine safety device 102, the machine safety device may be configured to maintain normal operation of the machine when all of the connected personal safety devices 108 have wireless communication above a signal quality threshold (e.g., a threshold indicative of sufficient RF signal strength, such as an RSSI threshold value, etc.), and none of the connected personal safety devices 108 have an activated emergency stop switch 110. In some embodiments, a specific number of personal safety devices 108 (e.g., one personal safety device 108, two personal safety devices 108, three personal safety devices 108, etc.) to be connected with the machine safety device 102 to maintain normal operation.

The machine safety device 102 may stop operation of the machine (e.g., by opening a relay of the machine safety device 102, etc.) when any one of multiple events occurs: an internal fault of the machine safety device 102 is detected; one of the personal safety devices 108 currently connected with the machine safety device 102 loses wireless communication with the machine safety device 102; one of the personal safety devices 108 currently connected with the machine safety device 102 has an activated emergency stop switch 110; one or more of the multiple personal safety devices 108 currently connected with the machine safety device has a detected fault; etc.

These different conditions may inhibit the machine from operating during unsafe conditions. For example, in addition to stopping operation of the machine when an emergency stop switch 110 is activated, stopping operation of the machine when RF communication is lost or a fault of a personal safety device 108 occurs provides a precaution to inhibit situations where an operator attempts to activate an emergency stop button 110 but the personal safety device 108 is unable to properly transmit an emergency stop signal to the machine safety device 102. This may help to address situations that could arise in using the wireless emergency stop system 100 where personal safety devices 108 rely on wireless communication to trigger emergency stop events.

Any suitable RF protocol may be used for communication between the personal safety devices 108 and the machine safety device 102. For example, a specific RF frequency band may be selected so that the personal safety devices 108 and the machine safety device 102 operate on the same channel. In some embodiments, two RF channels may be used in a frequency diversity mode to increase immunity to RF interference. Each RF frequency band may include a defined number of available RF channels.

Each of the personal safety devices 108 may be configured to wirelessly connect to and disconnect from the machine safety device 102 according to a linking protocol that does not trigger an emergency stop of the machine. For example, the linking protocol may involve a personal safety device 108 receiving an action from an operator (e.g., activating a specific button, etc.) that is distinct from a loss of wireless communication with the machine safety device 102, and is distinct from activation of the emergency stop switch 110 of the personal safety device 108.

The linking protocol allows the personal safety devices 108 to be connected to and disconnected with the machine safety device 102 as desired, without triggering an emergency stop of the machine each time a personal safety device 108 is de-linked from the machine safety device 102.

For example, a user may hold down a linking button of the personal safety device 108 for a period of time (e.g., at least half a second, etc.) when in range of the machine safety device 102. The linking button is separate from the emergency stop button. If a link is established, the personal safety device 108 may indicate the successful connection via an indicator on the personal safety device 108.

Once a link is established between a personal safety device 108 and the machine safety device 102, transmission between the devices may be continuous to maintain the safety relays in a closed state. If the machine safety device 102 does not receive a valid telegram, data packet, message, etc., from a linked personal safety device 108 after a period of time, the safety relays may be opened. Each message may include an identifier that is unique to the machine in use, and may include a system address to inhibit the machine safety device from acting upon unassigned personal safety devices when an address combination does not match. For example, a system address may be matched with a sub-address of the PSD, a sub-address of the MSD, etc.

A user may unlink the personal safety device 108 from the machine safety device 102 using the linking and unlinking protocol that is separate from triggering an emergency stop. For example, a user may press an unlinking button for a specified amount of time (e.g., at least about three seconds, etc.) to unlink the personal safety device 108. The unlinking button may be the same as or separate from the linking button mentioned above, but should not be the same as the emergency stop button of the personal safety device 108. An indicator of the personal safety device 108 may indicate when the unlinking process is complete.

In some embodiments, when a personal safety device 108 activates an emergency stop, other personal safety devices 108 connected with the machine safety device may be notified of the emergency stop event, and also may be notified of which personal safety device 108 triggered the emergency stop.

Each personal safety device 108 may be configured as a machine access control where, e.g., the machine safety device 102 is configured to only allow the machine to run when a specified minimum number of personal safety devices 108 are online (e.g., connected with the machine safety device, etc.). For example, the machine safety device 102 may require at least one personal safety device 102 to be connected, at least two personal safety devices 102 to be connected, etc., before the machine safety device closes safety relay(s), before a safety bus issues a go condition command, etc. Therefore, if one or more users are attempting to control a machine, the machine safety device 102 can first check whether corresponding personal safety devices 108 are connected before allowing operation of the machine.

Each personal safety device may include a secure protocol for identifying a user, such as a radio frequency identification (RFID) card, a biometric identifier, etc. The user may have pre-defined authorization right(s), which can be stored locally and/or remotely. If the user has appropriate authorization right(s), the personal safety device 108 may be allowed to connect to the machine safety device 102. When the correct number of personal safety devices 108 are connected to the machine safety device 102, the machine safety device 102 can close its relay(s) and allow the machine to operate.

The machine safety device 102 and the personal safety devices 108 may comprise any suitable devices (e.g., computing devices, etc.) which may be configured to perform operations described herein using any suitable combination of software and/or hardware. For example, the machine safety device 102 and the personal safety devices may include any suitable circuitry, logic gates, microprocessor(s), computer-executable instructions stored in memory, etc., operable to cause the machine safety device 102 and the personal safety devices 108 to perform the actions described herein (e.g., triggering an emergency stop, etc.).

Figure 2:
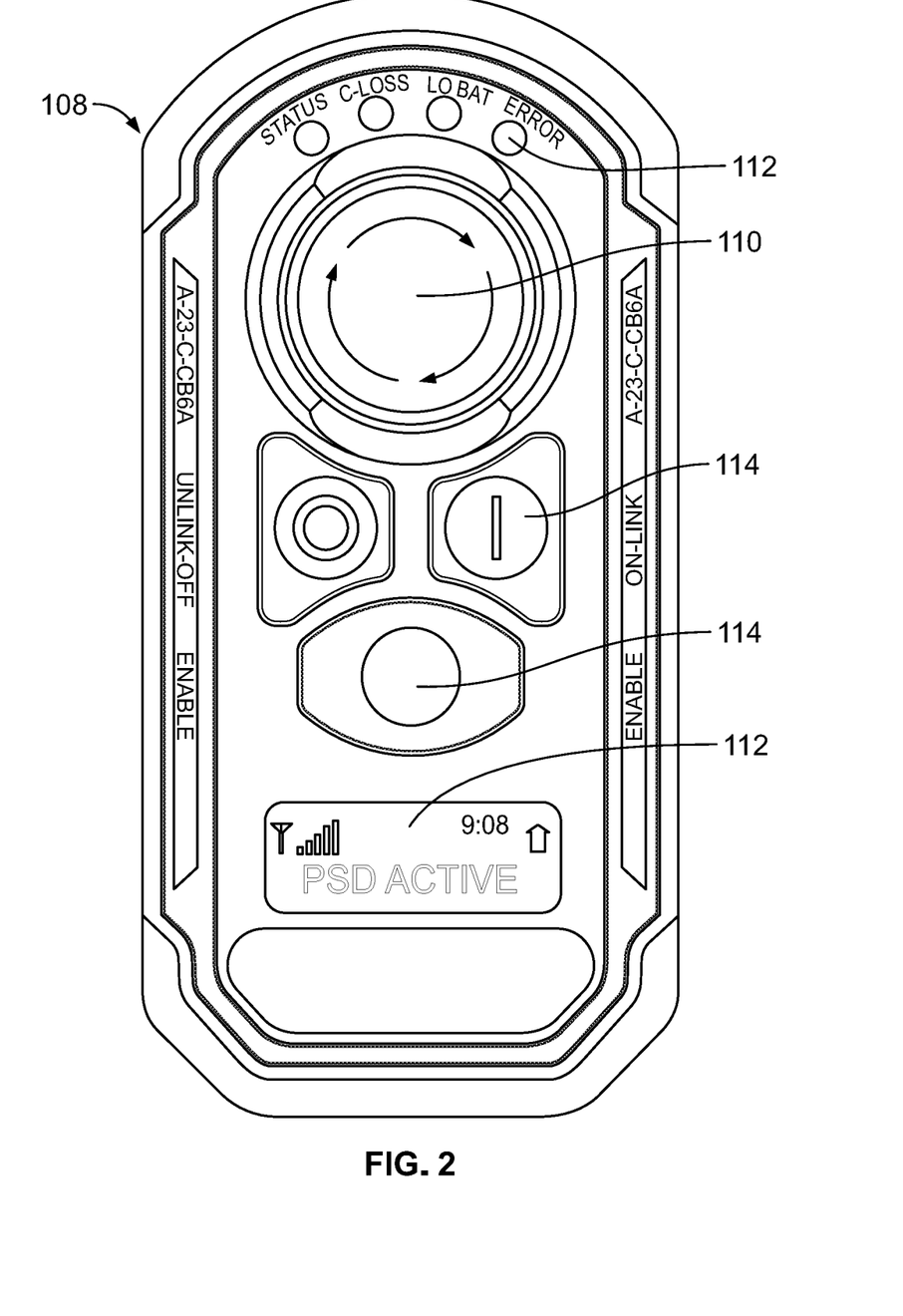
FIG. 2 is a front view of a personal safety device of the wireless emergency stop system illustrated in FIG. 1.

FIG. 2 illustrates one of the personal safety devices 108 of the wireless emergency stop system 100 shown in FIG. 1. As illustrated in FIG. 2, the personal safety device 108 includes an emergency stop switch 110. As described above, the emergency stop switch 110 is configured to, when activated, transmit an emergency stop signal to the machine safety device 102 to trigger an emergency stop of the machine. The emergency stop button 110 may be a twist release switch, a pull release switch, etc.

The personal safety device 108 may include indicators 112. The indicators 112 are configured to provide status information to an operator carrying the personal safety device 108. As shown in FIG. 2, the indicators 112 may include a display (e.g., a liquid crystal display, etc.), one or more light emitting diodes (LEDs), etc.

As illustrated in FIG. 2, the personal safety device 108 includes operation inputs 114. For example, the operation inputs 114 can include one or more buttons allowing an operator to access additional functionality of the personal safety device 108, such as linking and de-linking the personal safety device 108 with the machine safety device 102. For example, each personal safety device 108 may be pre-configured for the machine safety device 102 with an address, a sub-address, a channel, etc. For example, a machine safety device 102 may be configured to address any suitable number of personal safety devices 108 (e.g., about 15 personal safety devices 108, etc.). The personal safety device 108 and/or the machine safety device 102 may be configured to operate at any suitable pre-configured frequency (e.g., in the ISM band, at about 433 MHz, at about 450 MHz with 26 channels, at about 869 MHz, at about 915 MHz, at about 2.4 GHz, etc.).

In some embodiments, the personal safety device 108 may function primarily as a wireless E-stop device, such that the personal safety device 108 does not include any control functions for the machine. However, in this case the personal safety device 108 may still include operation inputs 114 for enabling and disabling the personal safety device 108, turning on and turning off the personal safety device 108, linking and de-linking the personal safety device 108 with the machine safety device 102, etc.

The personal safety device 108 may include a force sensor and/or a tilt sensor. The force sensor and/or tilt sensor may detect a fall event, etc. of an operator, and transmit the event to the machine safety device 102. In this case, the machine safety device 102 may trigger an emergency stop of the machine (e.g., because a fallen operator may not be able to correctly supervise the machine, may have been injured by the machine, etc.).

When the personal safety device 108 is not being used by an operator (e.g., is charging, etc.), the personal safety device 108 may be positioned so that the emergency stop button 110 is not visible. For example, the emergency stop button 110 may be faced away from a user, may be housed within a secondary enclosure for battery charging and storage, etc. The secondary enclosure could be locked if desired. The personal safety device 108 may include a rubber bumper for impact resistance, may include an IP67 rated housing for water resistance, etc.

In some embodiments, personal safety devices 108 may include visual and haptic (e.g., vibration) warning systems for conditions such as low battery, low RF signal, etc. Further, a connected personal safety device moves towards the edge of its operating range (e.g., about 100 meters from the machine safety device 102, etc.), the personal safety device 108 may alert the user to return to a location with a stronger signal.

Figure 3:
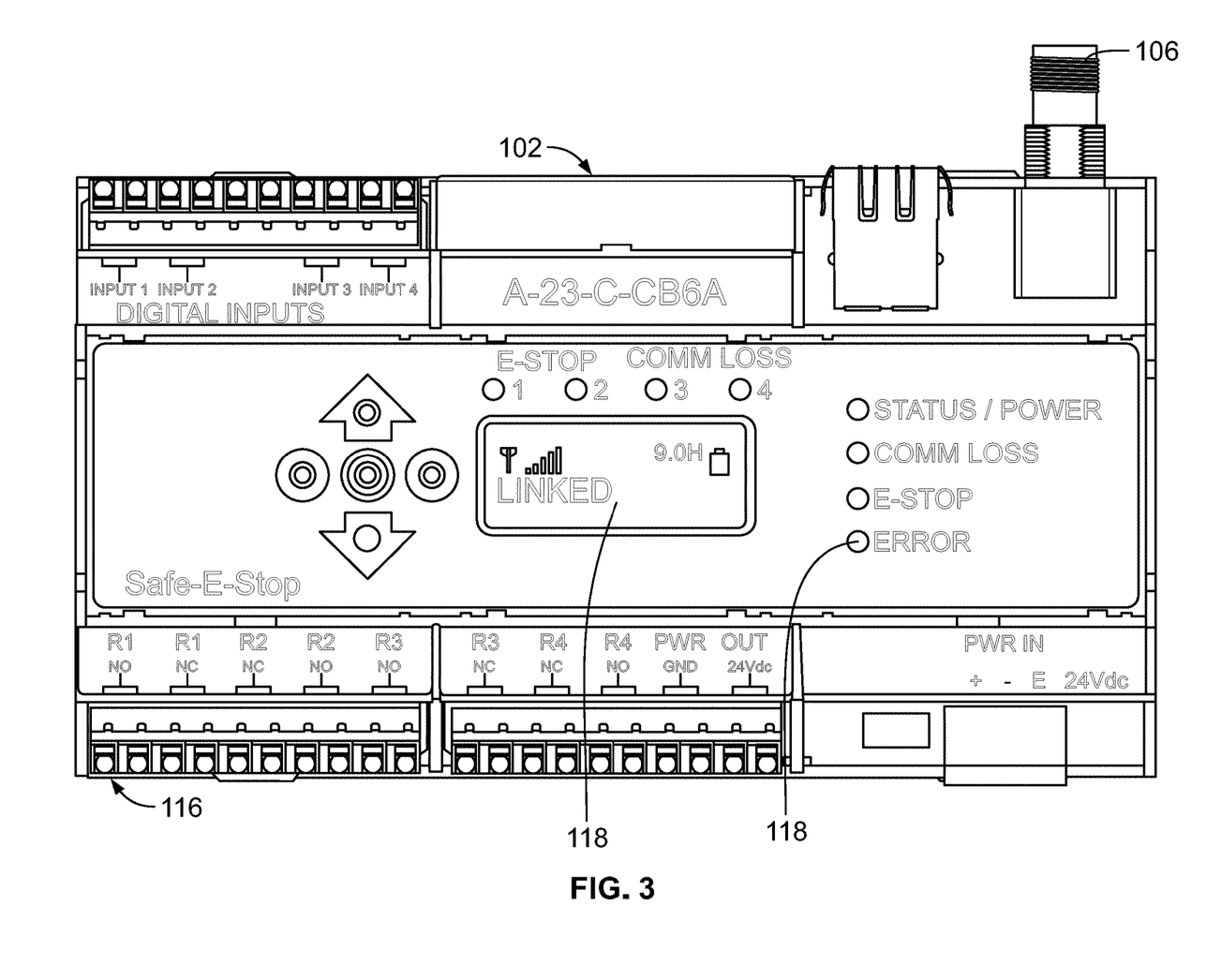
FIG. 3 is a front view of the machine safety device of the wireless emergency stop system illustrated in FIG. 1.

FIG. 3 illustrates the machine safety device 102 of the emergency stop system 100 shown in FIG. 1. As described above, the machine safety device 102 includes a wireless communication interface 106 for wireless communication with the personal safety devices 108. The wireless communication interface 106 illustrated in FIG. 3 is a connector for a wireless antenna, etc.

The machine safety device 102 also includes a machine stop circuit connection 116 for connection to a machine stop circuit (e.g., a hard wired E-Stop output, a safety bus connection, etc.). The machine stop circuit connection 116 may be connected to a main power circuit of the machine, a main power reset of the machine, a hard wired emergency stop button of the machine, a safety programmable logic controller (PLC), etc. For example, the machine safety device 102 may change a status of the safety bus to stop operation of the machine, etc.

As shown in FIG. 3, the machine safety device 102 includes indicators 118. The indicators 118 provide status information about the machine safety device 102, personal safety devices 108 in wireless communication with the machine safety device 102, etc. As shown in FIG. 3, the indicators 118 may include a display (e.g., a liquid crystal display, etc.), one or more light emitting diodes (LEDs), etc. For example, the indicators 118 may indicate operational states, errors, under-voltage conditions, relay statuses, Ethernet statuses, received signal strength indicator (RSSI) corresponding to wireless communication with the personal safety devices 108, etc.

The machine safety device 102 may comprise a programmable logic controller (PLC) device, and may be housed within an enclosure. The machine safety device 102 may be mountable to a DIN rail, may include an Ethernet IP connector, a power supply connector, multiple safety relays (e.g., at least four safety relays), etc.

According to another example embodiment of the present disclosure, a method of operating an emergency stop system is disclosed. The system includes a machine safety device wired to a machine stop circuit, and multiple personal safety devices each including an emergency stop switch and a wireless communication interface. The machine safety device also includes a wireless communication interface.

The exemplary method includes linking the machine safety device with more than one of the multiple personal safety devices at the same time by establishing wireless communication between the wireless communication interface of the machine safety device and the more than one of the multiple personal safety devices, and receiving, at one of the multiple personal safety devices, an activation of the emergency stop circuit of the personal safety device.

The method also includes, in response to receiving the activation of the emergency stop switch, transmitting an emergency stop signal to the machine safety device to trigger an emergency stop of the machine. Further, in response to receiving the emergency stop signal at the machine safety device, the method includes stopping operation of the machine via the machine stop circuit.

The method may include stopping operation of the machine includes stopping operation of the machine via the machine stop circuit by opening one or more relays of the machine safety device.

In some embodiments, the method may include operation of the machine when any one or more of the following events occurs: an internal fault of the machine safety device is detected; the at least one personal safety device loses wireless communication with the machine safety device; the at least one personal safety device is wirelessly connected with the machine safety device and has an activated emergency stop switch; and a fault is detected at the at least one personal safety device while the personal safety device is connected with the machine safety device.

The method can include maintaining normal operation of the machine when the at least one personal safety device is wirelessly connected with the machine safety device and an internal fault of the machine safety device is not detected. In addition, or alternatively, the method may include maintaining normal operation of the machine when: the at least one personal safety device is connected with the machine safety device; the at least one personal safety device has wireless communication with the machine safety device above a signal quality threshold and the emergency stop switch of the at least one personal safety device is activated.

Example embodiments described herein may allow an individual or group of operators to respond to an emergency situation without the delay typically associated with moving to a hard-wired e-stop station. In some cases, the closest machine mounted e-stop may be in the same danger zone created by the emergency. Rushing to the next available e-stop can be a hazard in itself, but also cost critical seconds to do so. Having an E-stop within reach during a crisis can save valuable seconds, potentially valuable equipment, and even lives. With redundant safety relays described herein, teams can work uninterrupted, knowing that they are secure and can focus on the task at hand Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wireless emergency stop system comprising:
    a machine safety device wired to a machine stop circuit for stopping operation of a machine when the machine stop circuit is activated, the machine safety device including a wireless communication interface; and
    multiple personal safety devices, each of the multiple personal safety devices including:
        a wireless communication interface for wireless communication with the machine safety device; and
        an emergency stop switch configured to, when activated, transmit an emergency stop signal to the machine safety device to trigger an emergency stop of the machine;
    wherein the machine safety device is configured to maintain wireless connections with more than one of the multiple personal safety devices at the same time when more than one of the multiple personal safety devices are wirelessly connected with the machine safety device;
    wherein, when none of the multiple personal safety devices are wirelessly connected with the machine safety device, the machine safety device is configured to maintain normal operation of the machine when an internal fault of the machine safety device is not detected;
    wherein, when one or more of the multiple personal safety devices are wirelessly connected with the machine safety device, the machine safety device is configured to maintain normal operation of the machine when all of the one or more connected personal safety devices have wireless communication above a signal quality threshold and none of the one or more connected personal safety devices have an activated emergency stop switch; and
    wherein each personal safety device is configured to wirelessly disconnect from the machine safety device without triggering an emergency stop of the machine in response to said personal safety device receiving activation of at least one operation input on said personal safety device by an operator, where the at least one operation input is distinct from activation of the emergency stop switch of said personal safety device and distinct from a loss of wireless communication of said personal safety device with the machine safety device thereby allowing said personal safety device to be wirelessly disconnected from the machine safety device without triggering an emergency stop of the machine.

2. The system of claim 1, wherein the machine safety device includes one or more safety relays, each of the one or more safety relays connected to the machine stop circuit.

3. The system of claim 2, wherein the machine safety device is configured to open one or more of the safety relays to stop operation of the machine when an emergency stop is triggered by one of the multiple personal safety devices.

4. The system of claim 2, wherein the machine safety device is configured to maintain the one or more safety relays in a closed state to allow operation of the machine while an emergency stop is not triggered by any of the multiple personal safety devices.

5. The system of claim 1, wherein:
    the machine safety device is configured to stop operation of the machine when an internal fault of the machine safety device is detected;
    the machine safety device is configured to stop operation of the machine when one or more of the multiple personal safety devices currently connected with the machine safety device loses wireless communication with the machine safety device;
    the machine safety device is configured to stop operation of the machine when one or more of the multiple personal safety devices currently connected with the machine safety device has an activated emergency stop switch; and the machine safety device is configured to stop operation of the machine when a fault is detected at one or more of the multiple personal safety devices currently connected with the machine safety device.

6. The system of claim 1, wherein each personal safety device is configured to:
    identify a user via an identification protocol; and
    allow the personal safety device to connect to the machine safety device only when an authorized user is identified via the identification protocol.

7. The system of claim 6, wherein each personal safety device comprises:
    the identification protocol, which includes at least one of an RFID card and a biometric identifier; and
    authorization rights are associated with the authorized user, the authorization rights stored locally within the personal safety device.

8. A wireless emergency stop system comprising:
    a machine safety device wired to a machine stop circuit for stopping operation of a machine when the machine stop circuit is activated, the machine safety device including a wireless communication interface; and
    at least one personal safety device including:
        a wireless communication interface for wireless communication with the machine safety device; and
        an emergency stop switch configured to, when activated, transmit an emergency stop signal to the machine safety device to trigger an emergency stop of the machine;
    wherein the at least one personal safety device is configured to wirelessly connect to and disconnect from the machine safety device according to a linking protocol that does not trigger an emergency stop of the machine, and the linking protocol includes wirelessly disconnecting the at least one personal safety device from the machine safety device without triggering the emergency stop of the machine when the at least one personal safety device receives activation of at least one operation input on the at least one personal safety device by an operator, where the at least one operation input is distinct from activation of the emergency stop switch of the at least one personal safety device and distinct from a loss of wireless communication of the at least one personal safety device with the machine safety device thereby allowing the personal safety device to be wirelessly disconnected from the machine safety device without triggering an emergency stop of the machine.

9. The system of claim 8, wherein:
    the machine safety device includes one or more safety relays, each of the one or more safety relays connected to machine stop circuit;
    the machine safety device is configured to open one or more of the safety relays to stop operation of the machine when an emergency stop is triggered by the at least one personal safety device; and
    the machine safety device is configured to maintain the one or more safety relays in a closed state to allow operation of the machine while an emergency stop is not triggered by the at least one personal safety device.

10. The system of claim 8, wherein:
    the machine safety device is configured to stop operation of the machine when an internal fault of the machine safety device is detected;
    the machine safety device is configured to stop operation of the machine when the at least one personal safety device loses wireless communication with the machine safety device;
    the machine safety device is configured to stop operation of the machine when the at least one personal safety device is wirelessly connected with the machine safety device and has an activated emergency stop switch; and
    the machine safety device is configured to stop operation of the machine when a fault is detected at the at least one personal safety device while the at least one personal safety device is connected with the machine safety device.

11. The system of claim 8, wherein:
    the at least one personal safety device includes multiple personal safety devices; and
    the machine safety device is configured to maintain normal operation of the machine when only when a specified minimum number of the multiple personal safety devices are connected with the machine safety device.

12. A method of operating a wireless emergency stop system including a machine safety device wired to a machine stop circuit, and multiple personal safety devices, the machine safety device including a wireless communication interface, and each of the multiple personal safety devices including an emergency stop switch and a wireless communication interface, the method comprising:
    linking the machine safety device with more than one of the multiple personal safety devices at the same time by establishing wireless communication between the wireless communication interface of the machine safety device and the more than one of the multiple personal safety devices;
    transmitting continuous periodic messages from each linked personal safety device to the machine safety device;
    receiving, at one of the multiple personal safety devices, an activation of the emergency stop switch of said personal safety device;
    in response to receiving the activation of the emergency stop switch, transmitting an emergency stop signal to the machine safety device to trigger an emergency stop of the machine;
    in response to receiving the emergency stop signal at the machine safety device or failing to receive the continuous periodic messages from one of the linked personal safety devices at the machine safety device after a specified period of time, stopping operation of the machine via the machine stop circuit; and
    wirelessly disconnecting at least one of the linked multiple personal safety devices from the machine safety device without triggering an emergency stop of the machine in response to said personal safety device receiving activation of at least one operation input on said personal safety device by an operator, where the at least one operation input is distinct from activation of the emergency stop switch of said personal safety device and distinct from a loss of wireless communication of said personal safety device with the machine safety device thereby allowing said personal safety device to be wirelessly disconnected from the machine safety device without triggering an emergency stop of the machine.

13. The method of claim 12, wherein:
the machine safety device includes one or more relays and/or a safety bus connected to a machine stop circuit and/or a safety PLC; and
stopping operation of the machine includes stopping operation of the machine via the machine stop circuit by opening the one or more relays or changing the status on the safety bus.

14. The method of claim 12, further comprising:
stopping operation of the machine when an internal fault of the machine safety device is detected;
stopping operation of the machine when at least one of the personal safety devices connected with the machine safety device loses wireless communication with the machine safety device;
stopping operation of the machine when at least one of the personal safety devices connected with the machine safety device has an activated emergency stop switch; and
stopping operation of the machine when a fault is detected in at least one of the personal safety devices connected with the machine safety device.

15. The method of claim 14, further comprising, when an emergency stop is triggered by one of the personal safety devices, notifying other personal safety devices connected with the machine safety device of the emergency stop event, and/or notifying other personal safety devices connected with the machine safety device of which one of the personal safety devices triggered the emergency stop.

16. The system of claim 1, wherein each of the one or more connected personal safety devices are configured to transmit continuous periodic messages to the machine safety device, and wherein:
the machine safety device is configured to stop operation of the machine in response to failing to receive the continuous periodic messages from one of the one or more connected personal safety devices after a specified period of time;
the machine safety device is configured to stop operation of the machine when an internal fault of the machine safety device is detected;
the machine safety device is configured to stop operation of the machine when one or more of the multiple personal safety devices currently connected with the machine safety device loses wireless communication with the machine safety device;
the machine safety device is configured to stop operation of the machine when one or more of the multiple personal safety devices currently connected with the machine safety device has an activated emergency stop switch; and
the machine safety device is configured to stop operation of the machine when a fault is detected at one or more of the multiple personal safety devices currently connected with the machine safety device.

17. The system of claim 1, wherein each of the one or more connected personal safety devices are configured to transmit continuous periodic messages to the machine safety device, and wherein the machine safety device is configured to stop operation of the machine in response to failing to receive the continuous periodic messages from one of the one or more connected personal safety devices after a specified period of time.

18. The system of claim 1, wherein activation of the at least one operation input on said personal safety device by the operator includes activation for a specified period of time, and wherein said personal safety device comprises a force sensor and/or a tilt sensor configured to detect a fall event by the operator and to transmit the event to the machine safety device.

19. The method of claim 12, wherein said personal safety device includes an indicator adapted to indicate when an unlinking process is complete, and wherein said personal safety device comprises a force sensor and/or a tilt sensor configured to detect a fall event by the operator and to transmit the event to the machine safety device.

20. The system of claim 8, wherein the at least one operation input includes a same button or switch that is used to wirelessly link said personal safety device with the machine safety device and wherein said personal safety device comprises a force sensor and/or a tilt sensor configured to detect a fall event by the operator and to transmit the event to the machine safety device.

21. The system of claim 1, wherein each personal safety device is configured to wirelessly disconnect from the machine safety device without triggering an emergency stop of the machine in response to a user pressing an unlinking button of the personal safety device for a specified amount of time of at least about three seconds.

22. The method of claim 12, wherein the method includes wirelessly disconnecting at least one of the linked multiple personal safety devices from the machine safety device without triggering an emergency stop of the machine in response to a user pressing an unlinking button of the personal safety device for a specified amount of time of at least about three seconds.

* * * * *